(12) United States Patent
Rengarajan et al.

(10) Patent No.: US 12,175,826 B2
(45) Date of Patent: Dec. 24, 2024

(54) CHARGING LOCKER INCLUDING A CHARGING STATION

(71) Applicant: INTERNATIONAL BUSINESS MACHINES CORPORATION, Armonk, NY (US)

(72) Inventors: Vikram Rengarajan, Irving, TX (US); Subil Mathew Abraham, Lewisville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 3 days.

(21) Appl. No.: 18/159,552

(22) Filed: Jan. 25, 2023

(65) Prior Publication Data
US 2023/0169537 A1 Jun. 1, 2023

Related U.S. Application Data

(63) Continuation of application No. 17/219,571, filed on Mar. 31, 2021, now Pat. No. 11,625,747.

(51) Int. Cl.
*G07F 15/00* (2006.01)
*G05F 1/66* (2006.01)
(Continued)

(52) U.S. Cl.
CPC .............. *G07F 15/006* (2013.01); *G05F 1/66* (2013.01); *G06Q 30/0238* (2013.01);
(Continued)

(58) Field of Classification Search
CPC .. H04L 67/125; G06Q 20/20; G06Q 30/0238; G06Q 50/06; G06F 1/66; G07F 15/006; G07F 17/12
See application file for complete search history.

(56) References Cited

U.S. PATENT DOCUMENTS

| 7,804,274 B2* | 9/2010 | Baxter | ............... G06Q 20/3278 414/281 |
| 7,952,325 B2* | 5/2011 | Baxter | .................... B60L 53/31 414/281 |

(Continued)

FOREIGN PATENT DOCUMENTS

| CH | 713481 A2 * | 3/2018 |
| CN | 104538958 B | 10/2015 |

(Continued)

OTHER PUBLICATIONS

IBM: List of IBM Patents or Patent Applications Treated as Related, Jun. 8, 2023, 2 pg.
(Continued)

*Primary Examiner* — Crystal J Barnes-Bullock
(74) *Attorney, Agent, or Firm* — CUENOT, FORSYTHE & KIM, LLC

(57) ABSTRACT

A charging locker including a charging station. The charging locker can receive a power connection to a user device via the charging station. The charging locker can actuate a lock for a door of the charging locker to a locked state. the charging station can provide power that charges the user device. Responsive to receiving a user event when the lock for the door of the charging locker is in the locked state, the charging locker can actuate the lock for the door of the charging locker to an unlocked state.

20 Claims, 7 Drawing Sheets

(51) Int. Cl.
*G06Q 30/0238* (2023.01)
*G06Q 50/06* (2012.01)
*G07F 17/12* (2006.01)
*H04L 67/125* (2022.01)
*G06Q 20/20* (2012.01)

(52) U.S. Cl.
CPC ............. *G06Q 50/06* (2013.01); *G07F 17/12* (2013.01); *H04L 67/125* (2013.01); *G06Q 20/20* (2013.01)

(56) References Cited

U.S. PATENT DOCUMENTS

| | | | |
|---|---|---|---|
| 9,610,852 B2* | 4/2017 | Lowenthal | ............ B60L 53/665 |
| D788,709 S | 6/2017 | Yeo | |
| 10,857,902 B2* | 12/2020 | Goei | ........................ B60L 53/62 |
| 11,258,282 B2 | 2/2022 | Baldasare | |
| 11,625,747 B2 | 4/2023 | Rengarajan et al. | |
| 2010/0013433 A1* | 1/2010 | Baxter | .................. G07F 15/003 320/109 |
| 2010/0145542 A1 | 6/2010 | Chapel et al. | |
| 2014/0098247 A1 | 4/2014 | Rao et al. | |
| 2015/0066227 A1 | 3/2015 | Chapel et al. | |
| 2015/0317706 A1 | 11/2015 | Sakata et al. | |
| 2016/0209899 A1 | 7/2016 | Brantner et al. | |
| 2016/0344138 A1 | 11/2016 | Kazmier | |
| 2017/0039660 A1* | 2/2017 | Tourigny | .............. H01M 10/42 |
| 2017/0187210 A1 | 6/2017 | Cogill | |
| 2018/0012438 A1* | 1/2018 | Sinofsky | .................. G07F 5/26 |
| 2021/0249882 A1 | 8/2021 | Baldasare | |
| 2021/0265843 A1 | 8/2021 | Baldasare | |
| 2022/0181887 A1 | 6/2022 | Baldasare | |
| 2022/0219563 A1 | 7/2022 | Lu | |
| 2022/0318842 A1 | 10/2022 | Rengarajan et al. | |

FOREIGN PATENT DOCUMENTS

| | | | |
|---|---|---|---|
| CN | 205355841 U | | 6/2016 |
| CN | 104868326 B | | 10/2017 |
| CN | 208623343 U | * | 3/2019 |
| DE | 102011113354 A1 | | 3/2013 |
| GB | 2528911 A | | 2/2016 |
| KR | 101948867 B1 | * | 5/2019 |
| WO | 2012076730 A1 | | 6/2012 |

OTHER PUBLICATIONS

"Ask The Salty Waitress: How do I discourage laptop squatters at my restaurant?" [online] TheTakeout.com [retrieved Feb. 26, 2020], retrieved from the Internet: <https://thetakeout.com/how-do-i-discourage-laptop-squatters-at-my-restaurant-1836971274>, 4 pg.

"Brightbox Smart Charging Locker by KwikBoost," [online] © 2021 KwikBoost [retrieved Mar. 31, 2021], retrieved from the Internet: <https://kwikboost.com/product/brightbox-smart-charging-locker/>, 3 pg.

"Broadband Over Power Lines," [online] Wikipedia, the free encyclopedia, Sep. 29, 2019, retrieved from the Internet: <https://en.wikipedia.org/wiki/Broadband_over_power_lines>, 5 pg.

"ChargeBox," [online] ChargeBox.com [retrieved Mar. 31, 2021], retrieved from the Internet: <https://www.chargebox.com/charging-solutions/>, 12 pg.

"Go To-U," [online] © 2017-2021 Go To-U Inc., [retrieved Mar. 31, 2021], retrieved from the Internet: <https://www.go-tou.com/>, 4 pg.

"Locketgo," [online] © Copyright Locketgo 2020 [retrieved Mar. 31, 2021], retrieved from the Internet: <https://locketgo.com/en., 17 pg.

"Many NYC Starbucks Locations About To Put An End To 'Squatters'," [online] CBS New York © 2021 CBS Broadcasting Inc., Aug. 5, 2011, retrieved from the Internet: <https://newyork.cbslocal.com/2011/08/05/many-nyc-starbucks-locations-about-to-put-an-end-to-squatters/>, 4 pg.

"Paddly Lockers," [online] © 2016-2017 Paddly [retrieved Mar. 31, 2021], retrieved from the Internet: <http://www.mypaddly.com/faq.php>, 4 pg.

"Power-Line Communication," [online] Wikipedia, the free encyclopedia, Feb. 11, 2020, retrieved from the Internet: <https://en.wikipedia.org/wiki/Power-line_communication>, 11 pg.

Alini, E., "No More Perks: Coffee Shops Pull the Plug on Laptop Users," [online] The Wall Street Journal, Feb. 26, 2020, retrieved from the Internet: <https://www.wsj.com/articles/SB124950421033208823>, 1 pg.

Forbes, P., "Ny Starbucks Covering Outlets, Cutting Off Laptop Squatters," [online] © 2021 Vox Media, LLC, Aug. 3, 2011, retrieved from the Internet: <https://www.eater.com/2011/8/3/6665127/ny-starbucks-covering-outlets-cutting-off-laptop->, 2 pg.

Mell et al., "The NIST Definition of Cloud Computing", Recommendations of the National Institute of Standards and Technology, Special Publication 800-145, Sep. 2011, 7 pages.

Popken, B., "Indie Coffee Shops Evict Wi-Fi Squatters," [online] © 2020 NBCNews.com, Aug. 20, 2013, retrieved from the Internet: <https://www.nbcnews.com/businessmain/indie-coffee-shops-evict-wi-fi-squatters-6C10945777>, 5 pg.

Stabiner, K., "What to Do When Laptops and Silence Take Over Your Cafe?" [online] © 2021 The New York Times Company, Feb. 13, 2018, retrieved from the Internet: <https://www.nytimes.com/2018/02/13/dining/cafe-wifi-remote-workers.html>, 6 pg.

Thrasher, M., "Starbucks And Other Coffee Shops Want To Stop People From Camping Out All Day," [online] Copyright © 2021 Insider Inc., Jul. 12, 2013, retrieved from the Internet: <https://www.businessinsider.com/coffee-shops-are-banning-laptops-2013-7>, 5 pg.

* cited by examiner

CHARGING LOCKER INCLUDING A CHARGING STATION

BACKGROUND

The present invention relates to power charging of user devices.

The use of mobile devices, such as smartphones, tablet computers, laptop computers, etc., is commonplace. To support mobility, mobile devices typically include rechargeable batteries used to power the devices. Such batteries store a finite amount of energy and need to be recharged from time to time. To make charging of mobile device batteries more convenient in their facilities, stores, such as cafes, coffee shops, etc., and other facilities oftentimes provide charging outlets and/or charging ports for use by customers to charge their mobile devices.

SUMMARY

A method includes receiving, by a charging locker including a charging station, a power connection to a user device via the charging station. The method also can include actuating, by the charging locker, a lock for a door of the charging locker to a locked state. The method also can include providing, by the charging station, power that charges the user device. The method also can include responsive to receiving a user event when the lock for the door of the charging locker is in the locked state, actuating, by the charging locker, the lock for the door of the charging locker to an unlocked state.

A system includes a charging locker including a charging station configured to receive a power connection to a user device via the charging station. The system also includes a processor programmed to initiate executable operations. The executable operations can include actuating a lock for a door of the charging locker to a locked state. The executable operations also can include providing, by the charging station, power that charges the user device. The executable operations also can include, responsive to receiving a user event when the lock for the door of the charging locker is in the locked state, actuating, by the charging locker, the lock for the door of the charging locker to an unlocked state.

A computer program product includes a computer readable storage medium having program code stored thereon. The program code is executable by a data processing system to initiate operations. The operations include receiving, by a charging locker including a charging station, a power connection to a user device via the charging station. The operations also can include actuating, by the charging locker, a lock for a door of the charging locker to a locked state. The operations also can include providing, by the charging station, power that charges the user device. The operations also can include, responsive to receiving a user event when the lock for the door of the charging locker is in the locked state, actuating, by the charging locker, the lock for the door of the charging locker to an unlocked state.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
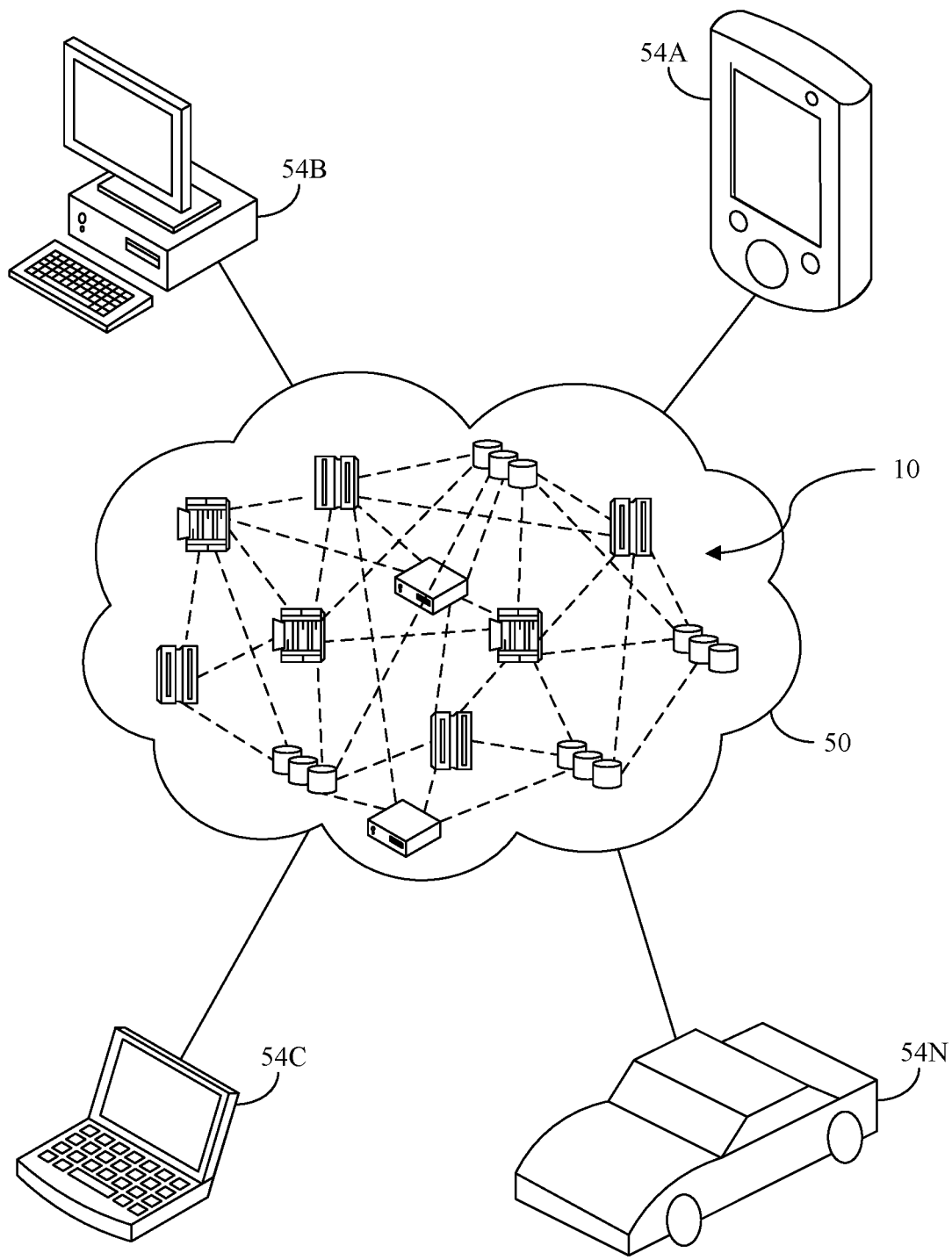
FIG. 1 depicts a cloud computing environment according to an embodiment of the present invention.

This disclosure relates to power charging of user devices. In accordance with the inventive arrangements disclosed herein, customers can be assigned power charging credits based on in-store purchases. The customers can use the power charging credits to charge their user devices at charging stations. Power charging credits can be detected from the customer's power charging credits based on an amount of energy consumed by the customer's user devices and/or an amount of time the user devices are charged. The power charging credits can be assigned, deducted, and transferred using a distributed ledger, such as a blockchain. Numerous arrangements related to assignment, use and deduction of power charging credits are described herein.

Several definitions that apply throughout this document now will be presented.

As defined herein, the term "store" means a physical place where a customer may purchase goods and/or services.

As defined herein, the term "in-store transaction" means a purchase transaction made at a store for a customer.

As defined herein, the term "customer" means a person (i.e., a human being).

As defined herein, the term "user" means a person.

As defined herein the term "user device" means a portable rechargeable device used by a person. Examples of a user device include a smart phone, a portable computer (e.g., a laptop computer, a tablet computer, etc.), a smart watch, smart glasses, a rechargeable mouse, a rechargeable keyboard, rechargeable headphones, and a portable rechargeable power supply.

As defined herein, the term "charging station" means a power charging device including at least one power outlet, at least one power charging port and/or at least one wireless charger, the power charging device configured to be operable between an activated state in which the power charging device provides power to the at least one power outlet, at least one power charging port and/or at least one wireless charger, and a deactivated state where the power charging device does not provide power to the at least one power outlet, at least one power charging port and/or at least one wireless charger.

As defined herein, the term "charging station" means an apparatus including at least one power charging port, power outlet and/or wireless charger used for charging user devices.

As defined herein, the term "energy consumption" means an amount of energy consumed by at least one user device to operate and/or charge at least one battery while the user device is charging. Energy consumption typically is measured in kilowatt-hours (kWh), but also may be measured in joules (J). As the term "energy consumption" is defined herein, an amount of time a user device is charged is not energy consumption. For example, assume a first user device and a second user device both are charged for the same amount of time at the same voltage. If the first user device draws more current than the second user device while they are charging, the first user device will have higher energy consumption than the second user device, even though the devices are charged for the same amount of time.

As defined herein the term "power" means an amount of energy transferred per unit of time. Power typically is measured in watts (W).

As defined herein, the term "distributed ledger" means a consensus of replicated, shared, and synchronized digital data, having no central administration, geographically spread across multiple sites, countries, and/or institutions. As the term "distributed ledger" is defined herein, a distributed database is not a distributed ledger. In this regard, a distributed database has central administration.

As defined herein, the term "blockchain" means a form of distributed ledger comprising a growing list of records, called blocks, that are linked using cryptography.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "automatically" means without user intervention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
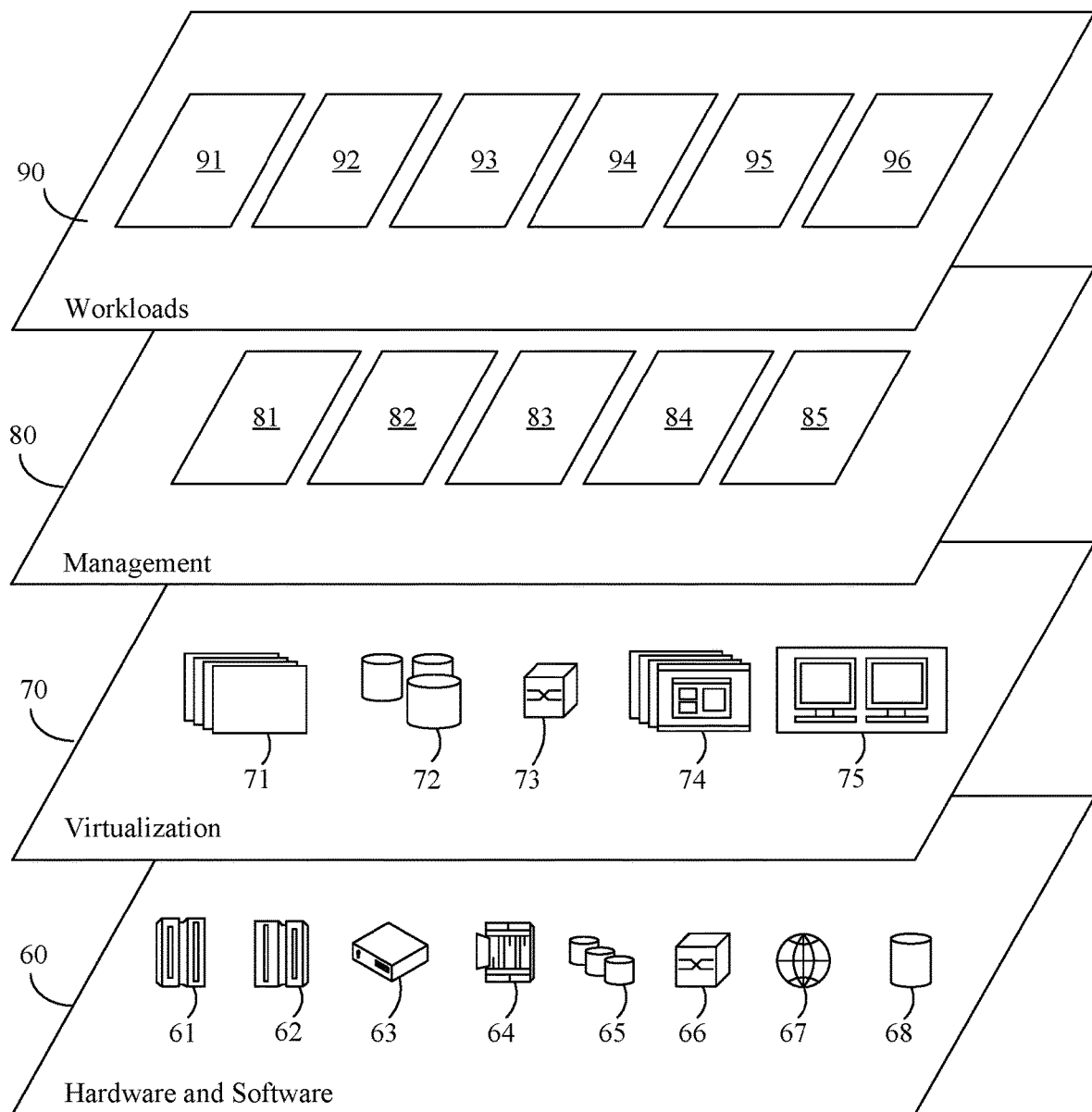
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In an example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user experience 96.

Figure 3:
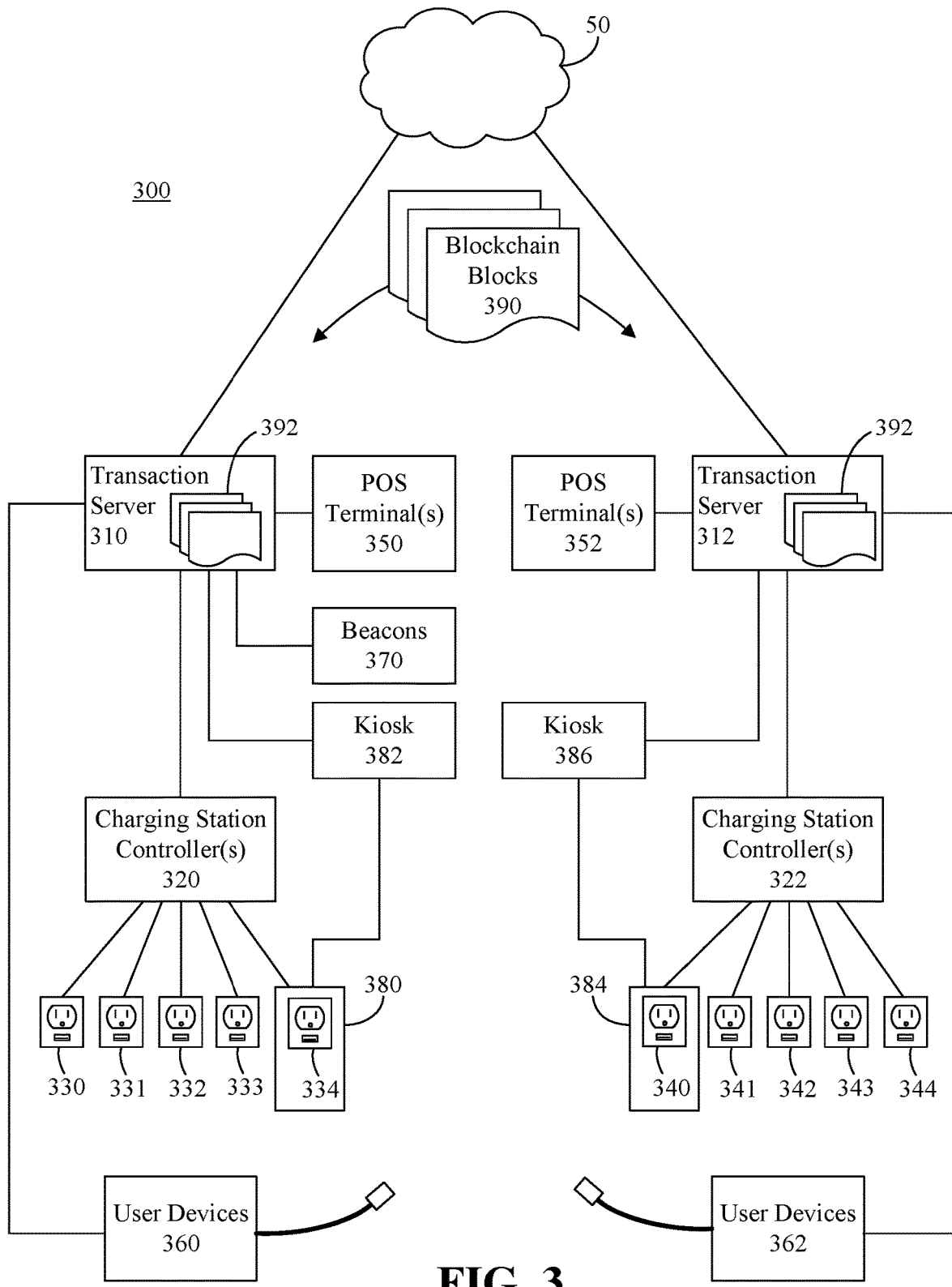
FIG. 3 is a block diagram illustrating example architecture for a power charging system.

FIG. 3 is a block diagram illustrating example architecture for a power charging system 300. The power charging system 300 can include a plurality of transaction servers 310, 312 communicatively linked to the cloud computing environment 50, for example via the Internet. The transaction servers 310, 312 can be implemented as data processing systems. The transaction server 310 can be communicatively linked to one or more charging station controllers 320. The transaction server 312 can be communicatively linked to one or more charging station controllers 322 in a similar manner. The charging station controller(s) 320 can be communicatively linked to a plurality of charging stations 330, 331, 332, 333, 334, and the charging station controller(s) 322 can be communicatively linked to a plurality of charging stations 340, 341, 342, 343, 344. Further, the transaction server 310 can be communicatively linked to one or more Point of Sale (POS) terminals 350 (e.g., electronic cash registers, electronic payment terminals, etc.), and the transaction server 312 can be communicatively linked to one or more Point of Sale (POS) terminals 352. User devices 360, 362 can interface with the transaction servers 310, 312, for example using mobile applications and/or web browsers accessing web-based applications, to gain access to the charging stations 330-334, 340-344, as will be described herein.

Each communication link between the transaction servers 310, 312 and the charging station controllers 320, 322, between the transaction servers 310, 312 and the POS terminals 350, 352 and between the transaction servers 310, 312 and the user devices 360, 362 can be implemented, for example, using a personal area network (PAN), a local area network (LAN), a wide area network (WAN), a Virtual Private Network (VPN), the Internet, the Public Switched Telephone Network (PSTN), and/or similar technologies. A PAN can be implemented, for instance, using Bluetooth®, Bluetooth® Low Energy (BTE), Wireless Universal Serial Bus (USB), ZigBee® or Infrared Data Association (IrDA). Each communication link between the charging station controllers 320, 322 and the charging stations 330-334, 340-344 can be implemented, for example, using a PAN, a LAN, a WAN, a VPN, the Internet, the PSTN, and/or similar technologies. In some arrangements, the charging station controllers 320, 322 and the charging stations 330-334, 340-344 can be configured to communicate over the electrical power wiring between the charging station controllers 320, 322 and the charging stations 330-334, 340-344 using powerline communication. For example, the charging station controllers 320, 322 and the charging stations 330-334, 340-344 each can include, or otherwise be communicatively coupled to, a powerline network adapter.

In a non-limiting arrangement, the charging station controllers 320, 322 can components of the transaction servers 310, 312 or co-located with the transaction servers 310, 312. In such an arrangement, external communication links between the transaction servers 310, 312 and the charging station controllers 320, 322 need not be established. Instead, the charging stations 330-334 can establish communication links with the transaction server 310 and the charging stations 340-344 can establish communication links with the transaction server 312. For example, communication links between the transaction servers 310, 312 and the charging stations 330-334, 340-344 can be implemented, for example, using PANs, LANs, WANs, VPNs, the Internet, the PSTN, and/or similar technologies.

By way of example, a transaction server 310 can be configured to monitor purchase transactions made via one or more POS terminals 350 for a particular facility (e.g., business location). Similarly, a transaction server 312 can be configured to monitor purchase transactions made via one or more POS terminals 352 for another particular facility. In an example, a business may maintain a transaction server 310 at each of a plurality of facilities, in which case a transaction server 310 can communicate with one or more charging station controller(s) 320 and one or more POS terminals 350 located at the same facility. In another example, a business may maintain one or more centrally located transaction servers 310 with which charging station controllers 320 and POS terminals 350 deployed at a plurality of facilities communicate. If the charging station controller 320 is a component of the transaction server 310 or co-located with the transaction server 310, the transaction server 310 can communicate with the charging stations 330-334 and the POS terminals 350, regardless whether the transaction server 310 is remotely located or located at a facility where the POS terminals 350 and charging stations 330-334 reside.

In operation, a customer can initiate an in-store transaction, such as a purchase transaction at a facility, such as a coffee shop, cafe, restaurant, arena, movie theater, mall, etc. In an arrangement, the customer can pay for the transaction using a user device 360, such as a smart phone, tablet computer, smart watch, smart glasses, or the like. For example, the customer can launch a mobile application that presents a barcode, quick response (QR) code, or the like which is scanned at the POS terminal 350 to make payment for the in-store transaction. In response, the POS terminal 350, or the transaction server 310 based in data received from the POS terminal 350, can determine from the bar code, QR code, etc. a user ID (user ID) assigned to the customer and create a data record in a database indicating a purchase amount of the in-store transaction. In another example, the customer can pay for the in-store transaction with the user device 360 using a near field communication (NFC) payment. In response, the POS terminal 350, or the transaction server 310 based in data received from the POS terminal 350, can determine from data transferred during the NFC payment the user ID assigned to the customer and create a data record in a database indicating a purchase amount of the in-store transaction. In another example, the customer can pay for the in-store transaction using cash, credit card or debit card. If using cash, credit card or debit card, the customer can provide to a store clerk a user ID, which the store clerk can enter into the POS terminal 305, or the customer enter the user ID via a touchscreen or keypad of the POS terminal 350. In response, the POS terminal 350, or the transaction server 310, can create a data record in a database indicating a purchase amount of the in-store transaction for that user ID. Still, the purchase amount and user ID can be determined and stored to a computer-readable storage medium in any suitable manner, and the present arrangements are not limited in this regard.

In one or more arrangements, the user ID can be stored in a user profile for the customer accessible by the transaction servers 310, 312. For example, the user profile can be stored to one or more computer readable storage mediums in the cloud computing environment 50, such as in a database managed by one or more servers. The customer's user profile also can include, for example, one or more passwords, one or more passcodes, a listing of user devices used by the customer, instant messaging address (e.g., telephone number), e-mail address, etc. The listing of user devices can include, for example, a device identifier assigned to each of the customer's user devices, for example a media access control (MAC) address of each of the customer's user devices, a name assigned to each of the customer's user devices, a make and model of each of the customer's user devices, user device configurations (e.g., type of processor, type of GPU, amount of RAM, amount of data storage, type of data storage, and so on), etc. The customer can create and update the customer's user profile via the user portal 83 (FIG. 1) using a mobile application or web browser on a user device to connect to a user experience 96 (FIG. 1) application in the cloud computing environment 50. In illustration, each time the customer accesses the user experience 96 application, the mobile application or web browser can communicate to the user experience 96 the identifier of the user device 360 being used to connect to the user experience 96 application. The user experience 96 application can determine whether that user device 360 is already listed in the customer's user profile. If not, via the mobile application or web browser, the user experience 96 application can prompt the customer to choose whether to associate that particular user device 360 with the customer. If the customer chooses in the affirmative, the user experience 96 application can add that user device 360 to the customer's listing of user devices.

Based on the in-store transaction, the transaction server 310 can assign to the customer, for example to the customer's user ID, power charging credits. For example, the transaction server 310 can assign power charging credits based on the purchase amount, a frequency of purchases made by the customer with that store and/or an enterprise associated with the store, a promotion applied for the user purchasing one or more certain items, and so on. The customer may use the power charging credits to charge one or more of the customer's user devices 360 using one or more of the charging stations 330-334, 340-344 at the facility and other facilities. The power charging credits may be assigned to the customer's user profile and/or the customer's user account with the establishment. Via a mobile application, or web browser, a customer may access his/her user profile to view their available power charging credits, their power charging credit usage information, energy consumption quotas (e.g., an amount of time or energy consumption available to the user for the current day), and other user profile information. A customer also may transfer at least a portion of their power charging credits to one or more other users.

In illustration, responsive to the customer's in-store transaction, using the customer's user ID the transaction server 310 can access the customer's user profile and obtain the listing of identifiers for the customer's user devices 360. Using those identifiers, the transaction server 310 can monitor a network (e.g., a LAN or PAN) of the store to identify a connection to the network by one or more of the customer's user devices 360. Further, the transaction server 310 can track the physical location and movement of the customer's user devices 360 in the facility, for example using beacons 370 or another suitable indoor positioning system. By way of example, the network can include a plurality of beacons 370 that detect WiFi® communication signals generated by user devices 360 and determine physical location and movement within the store using triangulation, trilateration, or the like. In another example, the network can include an indoor positioning system that detect PAN communication signals generated by user devices 360 and determine physical location and movement within the store using triangulation, trilateration, or the like.

Tracking the physical location and movement of the customer's user devices 360 in the facility, the transaction server 310 can track a path of the customer with respect to locations of a plurality of charging stations 330-334 at the facility. Further, the transaction server 310 can determine whether the customer stops or pauses near at least one charging station 330-334 for at least a threshold period of time (e.g., at least three seconds, five seconds, ten seconds, etc.) that is presently available for use (i.e., not currently being used to charge other user devices). In this regard, the transaction server 310 can store, or otherwise access, data indicating the physical location of each of the charging stations 330-334 within the facility and compare the customer's physical location to that data. Further, the transaction server 310 can query the charging station controller 320 to determine which charging stations 330-334 are currently available. The transaction server 310 can select from among the charging stations 330-334 that currently are available the charging station 330 that is physically located nearest to the customer's physical location and activate the selected charging station 330 to provide power via one or more power outlets, one or more power charging ports and/or one or more wireless chargers.

The transaction server 310 can activate the charging station 330 by communicating to the charging station controller 320 a command to activate the charging station 330. In response, the charging station controller 320 can communicate a command to the charging station 330 to activate. In response, the charging station 330 can turn on power to the one or more power outlets, one or more power charging ports, and/or one or more wireless chargers, for example using one or more relays or other components suitable for this purpose. In this regard, activation of the charging station 330 can configure the charging station 330 to turn on one or more power outlets, one or more charging ports and/or one or more wireless chargers. The transaction server 310 can activate the charging stations 331-334 in a similar manner.

In an arrangement in which electrical wiring providing power to the charging station 330 for charging user devices 360 is connected to the charging station controller 320, responsive to receiving an activation command from the transaction server 310 to activate the charging station 330, the charging station controller 320 can activate the charging station 330 by turning on power to the electrical wiring, for example using a relay. Turning on the power to the electrical wiring can turn on power to the one or more power outlets, one or more power charging ports, and/or one or more wireless chargers. In an arrangement in which the charging station 330 does not include an additional power source to provide power to one or more other components of the power charging station 330 (e.g., processors, sensors, image capture devices, etc.), turning on the power to the electrical wiring can turn on those other components. The transaction server 310 can activate the charging stations 331-334 in a similar manner.

In one or more arrangements, the transaction server 310 can alert the customer as to which charging station 330 is assigned to the customer. For example, each of the charging stations can be labeled with a charging station identifier (e.g., one or more numbers, letters and/or symbols), and the transaction server 310 can communicate the charging station identifier to a mobile application, or web browser executing on the user device 360 accessing a web-based application to which the transaction server 310 has elevated access, an instant messaging address of the customer, or an e-mail address of the customer. The instant message address and e-mail address can be indicated in the customer's user profile. In another example, each charging station 330-334 can include at least one visible indicator, for example one or more lights (e.g., LEDs). The transaction server 310 can communicate to the charging station controller 320 a command to activate the visible indicator on the selected charging station 330 (e.g., illuminate one or more LEDs). In response, the charging station controller 320 can communicate a command to the charging station 330 causing the charging station 330 to activate the visible indicator. The charging station controller 320 and/or the charging station 330 can be configured to keep the visible indicator active until the charging station 330 detects power draw from the charging station 330, which indicates a user device 360 has been coupled to the charging station 330 for charging, and/or keep the visible indicator active for a threshold period of time.

In some instances, there may not be any charging stations 330-334 that are currently available. In response to detecting such circumstance, the transaction server 310 can add the customer to a waiting list and communicate an alert to the customer's user device indicating that the customer has been added to a waiting list and will be alerted when a charging station 330-334 becomes available. The transaction server 310 can monitor the charging stations 330-334 to determine when a charging station becomes available. In illustration, the transaction can determine when a charging station 330 no longer is being used to charge user devices 360 and there is no longer a customer within a threshold distance of the charging station 330. In response, the transaction server 310 can select a customer at the top of the waiting list and communicate an alert to that customer indicating a charging station currently is available for that customer. The transaction server also can indicate to the customer where the charging station 330 is located, for example as previously described.

In one or more arrangements, one or more of the customer's user devices 360 can communicate to the charging station 330 the user ID of the customer. For example, responsive to a user device 360 being coupled to a charging port (e.g., USB port, Lightening port, etc.) of the charging station 310, via the charging port the user device 360 can communicate to the charging station 310 the device identifier assigned to the user device 360. In response, the charging station 330 can communicate that device identifier to the charging station controller 320. In response, the charging station controller 320 can communicate that device identifier to the transaction server 310. The transaction server 310 can query the database of user profiles to determine the user ID of the customer to whom the user device 360 is assigned.

In another example, in lieu of, or in addition to, communicating the device identifier, the user device 360 can communicate the user ID for the customer to the charging station 330, which can communicate that user ID to the transaction server 310. For example, a mobile application on the user device 360, or a web browser on the user device 360 accessing a web-based application, can communicate the user ID to the charging station 330. In response, the charging station 330 can communicate that user ID to the charging station controller 320. In response, the charging station controller 320 can communicate that user ID to the transaction server 310.

In some examples, the user device 360 can communicate the device identifier and/or user ID to the charging station 330 via a PAN. For instance, if the user device 360 has Bluetooth® enabled, the customer can pair the user device 360 with the charging station 330 and communicate the device identifier and/or user ID to the charging station 330 via Bluetooth® or BTE. Regardless of the method used to communicate the device identifier and/or user ID, the charging station 330 can communicate the device identifier and/or user ID to the charging station controller 320. In response, the charging station controller 320 can communicate the device identifier and/or user ID to the transaction server 310.

In some examples, the user device 360 can communicate the device identifier and/or user ID to the charging station 330 via the power outlet in an arrangement in which the charging station 330 is configured to receive data via the power outlet, for example using a powerline communication. In illustration, the user device 360 can be configured to communicate data using powerline communication. For instance, the user device 360 can include, or otherwise be coupled to, a powerline network adapter, and the charging station 330 can include a powerline network adapter. In an arrangement in which the user device 360 is coupled to an external powerline network adapter, the user device 360 can couple to the external powerline network adapter using an ethernet cable, using WiFi®, using a PAN, etc.

Responsive to the charging station 330 detecting power draw from the charging station 330 commencing, the charging station 330 can communicate to the charging station controller 320 an indicator indicating that the charging station 330 is in use. In response, the charging station controller 320 can communicate an indicator to the transaction server 310 indicating that the charging station 330 is in use. In response, the transaction server 310 can begin timing the amount of time the customer uses the charging station 330. Responsive to the charging station 330 detecting power draw from the charging station 330 ceasing, the charging station 330 can communicate to the charging station controller 320 an indicator indicating that the power draw from the charging station 330 has ceased. In response, the charging station controller 320 can communicate an indicator to the transaction server 310 indicating that the power draw from the charging station 330 has ceased. In response, the transaction server 310 can stop timing the amount of time the customer uses the charging station 330. In this regard, the transaction server 310 can monitor and determine the amount of time various customers use various charging stations 330-334.

In addition to, or in lieu of, tracking the amount of time customers use the charging stations 330-334, the transaction server 310 also can monitor and determine the amount of power consumed by the customers user devices 360. In illustration, one or more of the charging stations 330-334 can include a power sensor that measures power consumption. While the customer uses the charging station 330, the charging station 330 can monitor data generated by the power sensor to determine a running total of energy consumption by the customer's user devices 360. The charging station 330 can communicate the running total of energy consumption to the charging station controller 320, which can communicate the running total of energy consumption to the transaction server. In this regard, the transaction server 310 can determine the energy consumption by various customers using various charging stations 330-334.

In another example, the transaction server 310 can store, other otherwise access, one or more data tables including records that indicate a level of energy consumption (e.g., an average level of energy consumption) for numerous different models of user devices 360. The data tables also may provide further granularity, for example indicating a level of energy consumption for particular configurations of various different models of user devices 360. The transaction server 310 can determine the amount of energy consumption for user devices 360 based on their level of energy consumption and the amount of time they are coupled to the charging stations 330-334. In illustration, responsive to being coupled to the charging station 330, the user devices 360 can communicate to the transaction server 310, either directly or via the charging station 330 and charging station controller 320, its MAC addresses and/or make and model information. If the user device 360 communicates its MAC address, the transaction server 310 can determine the make and model of the user device 360 using the customer's user profile, which may list the MAC address of each of the customer's user devices 360, or in any other suitable manner. The transaction server 310 can determine the energy consumption total by, for each of the customer's user devices 360 coupled to the charging station 330, multiplying the amount of time the user device 360 is coupled to the charging station 330 and the level of energy consumption indicated for that user device 360. Further, the transaction server 310 also can monitor a running total of the energy consumption by the user devices 360 based on the amount of time the user devices 360 are being charged and their levels of energy consumption.

The transaction server 310 can continue to monitor the physical location of the customer in the facility. Responsive to detecting the customer moving away from the charging station 330 by at least a threshold distance, or responsive to detecting the customer leaving the facility, after power draw from the charging station 330 has ceased, the transaction server 310 can deactivate the charging station 330 by communicating to the charging station controller 320 a command to deactivate the charging station 330. In response, the charging station controller 320 can communicate a command to the charging station 330 to deactivate. Deactivation of the charging station 330 configures the charging station 330 to turn off one or more power outlets, one or more charging ports and/or one or more wireless chargers. The transaction server 310 can deactivate the charging stations 331-334 in a similar manner.

In an arrangement in which electrical wiring providing power to the charging station 330 for charging user devices 360 is connected to the charging station controller 320, responsive to receiving a deactivation command from the transaction server 310 to deactivate the charging station 330, the charging station controller 320 can deactivate the charging station 330 by turning off power to the electrical wiring, for example using a relay. Turning off the power to the electrical wiring can turn off power to the one or more power outlets, one or more power charging ports, and/or one or more wireless chargers. In an arrangement in which the charging station 330 does not include an additional power source to provide power to one or more other components of the power charging station 330 (e.g., processors, sensors, image capture devices, etc.), turning off the power to the electrical wiring can turn off those other components. The transaction server 310 can deactivate the charging stations 331-334 in a similar manner.

Further, the transaction server 310 can deduct from the customer's power charging credits a number of power charging credits determine based on the amount of time the customer used the charging station 330 to charge the user device(s) 360, the amount of power provided by the charging station 330 to charge the user device(s) 360 and/or the number of user device(s) to which the charging station 330 provided power. In an example, the transaction server 310 can deduct power charging credits in real time as the customer continues to use the charging station 330, for example at a certain rate based on time, energy consumption and/or number of user devices 360 being charged. In another example, the transaction server 310 can deduct power charging credits responsive to the charging station 330 being deactivated.

In one or more arrangements, the transaction server 310 can continually monitor the amount of time customers use charging stations 330-334 and/or the amount of energy consumption used by customers' user devices 360, and implement actions based on the amount of time and/or energy consumption. For example, responsive to the amount of time the customer uses the charging station 330 exceeding one or more time threshold values and/or responsive to the amount of energy consumption by the customer's user device(s) 160 exceeding one or more power threshold values, the transaction server 310 can implement one or more actions.

In illustration, the transaction server 310 can determine a first time threshold value based on the amount of power charging credits assigned to the customer's user profile and/or the customer's user account. In one or more examples, each power charging credit can equate to a particular duration of time, and the first time threshold can be determined by multiplying the number of power charging credits by the particular duration of time (e.g., CC×T, where CC=the number of charging credits and T=the particular duration of time). In one or more examples, the first time threshold can be determined by multiplying the number of power charging credits by the particular duration of time and dividing by the number of the customer's user devices 360 being charged (e.g., (CC×T)/N, where CC=the number charging credits, T=the particular duration of time and N=the number of user devices being charged). The transaction server 310 can determine a second time threshold value based on the first time threshold. For example, the second time threshold can be a time that is fifteen minutes prior to the first time threshold.

Similarly, the transaction server 310 can determine a first energy consumption threshold value based on the amount of power charging credits assigned to the customer's user profile and/or the customer's user account. For instance, each power charging credit can equate to a particular amount of energy consumption, and the first energy consumption threshold can be determined by multiplying the number of power charging credits by the particular amount of energy consumption (e.g., CC×P, where CC=the charging credits and P=the amount of energy consumption). The transaction server 310 can determine a second energy consumption threshold value based on the first energy consumption threshold. For example, the second energy consumption threshold can be an energy consumption that is eighty-five percent of the first energy consumption threshold value.

Responsive to the transaction server 310 determining the amount of time the customer has used the charging station 330 exceeding the second time threshold value and/or responsive to the transaction server 310 determining the energy consumption by the customer's user device(s) 360 from the charging station 330 exceeding the second energy consumption threshold value, the transaction server 310 can generate an alert for presentation to the customer indicating that the amount of available time and/or available energy consumption remaining for that customer is low. By way of example, the transaction server 310 can communicate an alert to a mobile application or web-based application open by the user device 360, and the mobile application or web-based application can present the alert to the user. For instance, the transaction server 310 can communicate the alert to the charge station controller 320, which can communicate the alert to the charging station 330. The charging station 330 can communicate the alert to the user device 360 via the charging port, power outlet and/or PAN previously described. In another example, for example in an arrangement in which a user device 360 is coupled to a network (e.g., a WiFi® network) of the facility, the transaction server 310 can communicate the alert to the mobile application or web-based application via the network. In yet another example, the transaction server 310 can communicate the alert to the customer's instant messaging address or e-mail address.

Responsive to the transaction server 310 determining the amount of time the customer has used the charging station 330 exceeding the first time threshold value and/or responsive to the transaction server 310 determining the energy consumption by the customer's user device(s) from the charging station 330 exceeding the first energy consumption threshold value, the transaction server 310 can generate another alert for presentation to the customer indicating that the amount of available time and/or available energy consumption remaining for that customer has been reached. Further, the transaction server 310 can automatically deactivate the charging station 330 immediately or after a predetermined threshold of time, for example five minutes, thus ceasing delivery of power from the charging station 330. In another example, the transaction server 310 can cause the charging station 330 to reduce the amount of power being provided by the charging station 330 to operate and/or charge the customer's user device(s) 360. For instance, the transaction server 310 can communicate to the charging station controller 320 a command to reduce the amount of current being delivered to the charging station 330. In an arrangement in which power delivered to the charging station 330 is provided via the charging station controller 320, in response the charging station controller 320 can reduce the amount of power being delivered to the charging station 330. Otherwise the charging station controller 320 can communicate a command to the charging station 330 to reduce its power output. For example, the charging station 330 can include a current limiting device configured to reduce the amount of current provided for charging upon command.

In one or more arrangements, one or more of the alerts presented to the customer can provide the customer with opportunity to purchase additional power charging credits and/or gain more credits by making another purchase transaction. For example, an alert can include a link to a web application where the customer can purchase addition power charging credits via the mobile application or web-based application. In one or more arrangements, one or more of the alerts can present a coupon, offer, or other information which the customer may redeem, for example with a clerk and/or at a POS terminal 350, to purchase items, purchase additional power charging credits, etc.

In one or more arrangement, one or more visible indicators on the charging station 330 can be activated to indicate the first time threshold or the second time threshold, and/or the first power charging threshold or the second power charging threshold, has been reached. In illustration, next to a first LED the charging station 330 can display text indicating less than a certain amount of charging time remains, next to a second LED the charging station 330 can display text indicating no amount of charging time remains, next to a third LED the charging station 330 can display text indicating less than a certain amount of energy consumption remains, and next to a second LED the charging station 330 can display text indicating no amount of energy consumption remains. In one or more examples, the charging station 330 can include a display that indicates the amount of time and/or amount of power remaining. The display also can indicate when various time thresholds and/or energy consumption thresholds have been met.

In one or more arrangements, the number of user devices 360 customers may charge via the charging stations 330-334, 340-344 can be limited to a threshold number of user devices 360 (e.g., one, two, three or four). The threshold number of user devices 360 can be a pre-set value, can be determined based on the number of power charging credits assigned to the customers, or can be determined based on customer user profiles. For example, a user profile for the customer can indicate a membership level, and the number of user devices 360 the user may charge at any particular time can be based on that membership level. The transaction server 310 can assign to the customer a membership level based on, for example, the customer's purchase activity with the business and/or other businesses participating in power charging credit sharing over a threshold period of time, for example over the last week, over the last month, over the last year, etc.

In one or more arrangements, the user devices 360 can communicate to the transaction server 310, either directly or via the charging stations 330-334 and charging station controller 320, the battery charge level of the user devices 360. In illustration, via a mobile application or a web browser accessing a web-based application the user device 360 can continually or periodically communicate to the transaction server 310 the present charge level of the battery of the user device. In a non-limiting example, the transaction server can cause the charging station 330 to stop charging the user device 360 or reducing the charging power provided to the user device 360 responsive to the charge level reaching a threshold value, for example, 90%, 95% or 100%. In illustration, the transaction server 310 can communicate a command to the charging station 330 via the charging station controller 320.

In one or more arrangements, the user devices 360 can communicate to the transaction server 310, either directly or via the charging stations 330-334 and charging station controller 320, a rate of energy consumption by the user devices 360 and/or types of customer activity on the user devices 360. In one or more arrangements, the charging stations 330-334 can communicate to the transaction server 110, for example via the charging station controller 320, a rate of energy consumption by the user devices 360. Based on the rate of energy consumption for individual user devices, the transaction server 310 can determine a type of customer activity on the user devices 360. In illustration, the transaction server 310 can access an artificial intelligence (AI) computing system that uses machine learning to predict types of user activities on user devices 360 based on energy consumption. In illustration, a particular user device 360 may consume power at a first rate while being used for web browsing, consume power at a second rate while being used for word processing, consume power at a third rate while being used to play videos, consume power at a fourth rate while being used to play games, and so on. Using machine learning the AI system can determine typical energy consumption for particular user device models/hardware configurations based on training data.

In one or more arrangements, the transaction sever 310 can limit the availability of use of the charging stations 330-334 to user devices 360 that are not being used for certain activities. In illustration, a transaction server 310 for a movie theater may be configured to not allow the charging stations 330-334 to be used to charge user devices 360 that are being used to present videos (e.g., movies). For example, in response to determining that a user device 360 is being used to play videos (e.g., based on the energy consumption and/or data received from the user device 360), the transaction server 310 can command the charging station 330 to stop providing power to the user device 360 or to reduce the amount of current being supplied to the user device 360. Further, the transaction server 310 can communicate to the user device 360 an alert, for example as previously described, that is presented to the customer indicating that the type of activity the user device 360 is being used for is not permitted in that facility and requesting that the customer cease performing that activity. In another example, the alert can request that the customer reduce the energy consumption by the user device 360. The transaction sever 310 can wait for a threshold period of time, continuing to monitor the customer activity on the user device 360, and refrain from ceasing or reducing power delivery to the user device 360 if the customer stops using the user device 360 for the non-permitted activity, or otherwise reduces energy consumption by the user device 360, for example by stopping video playback.

In one or more arrangements, power charging credits also can be used by customers to access and use power charging lockers. For example, one or more of the charging stations 330-334, 340-344 can be components of charging lockers. In illustration, the charging station 334 can be a component of a charging locker 380. Using the user device 360, for example a mobile application executing on the user device 360 or a web browser executing on the user device 360 that accesses a web-based application, the customer can request access to a charging locker 380. In another example, the user can use a kiosk 382 that is communicatively linked to the transaction server 310 to request access to the charging locker 380. If the customer does not have enough power charging credits required to have access to a charging locker, the mobile application, web-based application, or kiosk 382 can provide the customer an opportunity to purchase charging credits. Assuming the customer has enough, or has purchased enough, charging credits the transaction server 310 or the kiosk 382 can present to the customer an identifier (e.g., locker number) for the charging locker 380 and provide to the customer access to the charging locker 380. The kiosk 382, for example, can manage a charging station controller 320 for the charging locker 380/charging station 334.

By way of example, the transaction server 310 can communicate to the user device 360 a code to be presented by the user device 360 to the user, or the kiosk 382 can present the code to the user via a display or printout (e.g., ticket). The user may enter the code into a keypad or touch screen of the charging locker 380 to open the charging locker. In another example, the transaction server 310 or kiosk 382 can communicate to the user device 360 a visible code (e.g., a bar code or QR code), or the kiosk 382 can print the visible code for the user. In an arrangement in which the kiosk 382 communicates the visible code, the kiosk 382 can obtain the customer's e-mail address or instant messaging address from the transaction server 310.

The customer can present the visible code to a scanner of the charging locker 380 to open the charging locker. In illustration, the transaction server 310 or kiosk 382 can communicate the code or visible code to the charging locker 380, for example via the charging station controller 320, and the charging locker 380 can compare that code or visible code it receives to the code or visible code entered or presented by the customer. If the codes or visible codes match, the charging locker 380 can open. The customer can place his/her user device(s) 360 in the charging locker 380 to be charged by coupling the user device(s) 360 to one or more outlets, charging ports and/or wireless chargers of the charging station 334. The customer can use the same code or visible code to open the charging locker 380 to remove his/her user device(s) 360.

In another example, the transaction server 310 can access an image of the customer (e.g., the customer's face) or a fingerprint of the customer from the customer's user profile, or the kiosk 382 can capture an image of the customer or a fingerprint of the customer while the customer is at the kiosk. Further, a camera of the charging locker 380 can capture an image of the customer, or a fingerprint scanner of the charging locker can capture an image of the customer's finger pad, for example in response to the customer selecting a key or menu item presented by the charging station, and the charging locker 380 can communicate the captured image to the transaction server 310 or the kiosk 382. In an arrangement, the customer can interact with the charging locker 380, for example via a keypad or touchscreen, to initiate the image capture. In another arrangement, the charging locker 380 can monitor for users within a threshold distance, for example as detected by a proximity sensor of the charging locker 380, and automatically capture the image of a user responsive to detecting the user within the threshold distance. In another arrangement, the camera can continually detect images and the charging locker 380 can select an image in which a face is at least a threshold size in an image.

The transaction server 310 or kiosk 382 can perform image recognition (e.g., facial recognition) on the captured image of the user and compare results of the image recognition to the image of the customer contained in the user profile or the image captured by the kiosk 382, or the transaction server 310 or kiosk 382 can compare data from the fingerprint scanner to the fingerprint of the customer contained in the user profile or captured by the kiosk 382. Responsive to the captured image of the user matching the image contained in the user profile or the image captured by the kiosk 382, or the fingerprint scan matching the fingerprint in the customer's user profile or captured by the kiosk 382, the transaction server 310 or kiosk 382 can communicate a command to the charging locker 380, for example via the charging station controller 320, that causes the charging locker 380 to open.

In another arrangement, the charging locker 380 can request from the transaction server 310 or the kiosk 382 the image of the customer or the fingerprint of the customer contained in the customer's user profile or captured by the kiosk 382. In such arrangement, the charging locker 380 can perform the image recognition on the captured image of the user and compare results of the image recognition to the accessed image of the customer, or the charging locker 380 can compare data from the fingerprint scanner to the fingerprint of the customer. Responsive to the captured image of the user matching the image in the customer's user profile or captured by the kiosk 382, or the fingerprint scan matching the fingerprint in the customer's profile or captured by the kiosk 382, the charging locker 380 can automatically open.

In an arrangement in which the charging locker 380 automatically captures the customer's image, the charging locker 380 can automatically open without the customer needing to touch a keypad or touchscreen. Again, the customer can place his/her user device(s) 360 in the charging locker 380 to be charged using one or more outlets, charging ports or wireless charging. The customer can initiate the charging locker 380 to scan the customer's image or fingerprint to open the charging locker 380 to remove his/her user device(s).

In one or more arrangements the charging stations 330-334 can be distributed around a facility, for example a mall, an amusement park, an arena, etc. Via a mobile application or a web browser executing on a user device 360, a customer can access a map that indicates where the charging stations 330-334. The map also can indicate which charging stations 330-334 currently are available. The map can be provided, for example, by the transaction server 310, which the customer can access via the mobile application or web browser. If there are charging stations 330-334 currently available, via the mobile application or web browser the customer can request to be added to a waiting list. The transaction server 310 can communicate an alert the user device 360 of the customer when a charging station 330 becomes available, for example as previously described. Further, the alert can present the map and indicate to the map where the available charging station 330 is located.

As noted, the transaction server 310 can track the customer's location via the beacons 370. In one or more arrangements, the user device 360 can communicate to the transaction server 310 the user device's global positioning system (GPS) coordinates, and the transaction server 310 can identify the customer's location using the GPS coordinates. In one or more arrangements, the transaction server 310 can identify the customer's location by accessing coordinates of the user device 360 provided by the customer's mobile communications provider based on performing triangulation or trilateration of mobile communication signals (e.g., cellular communication signals) communicated by the user device 360. Having knowledge of the customer's location, the transaction server 310 can indicate in the map the customer's location on the map and one or more routes for the customer to get to the charging station 330.

In one or more arrangements, the transaction server 310 can communicate to the user device 360 an alert presenting one or more coupons, offers, etc. for one or more establishments located within a threshold distance of one or more of the charging stations 330-334, or for establishments in which the charging stations 330-334 are located. This can serve to generate business for such establishments.

In one or more arrangements, in addition to tracking the customer's location, the transaction server 310 can monitor the battery level(s) of the customer's user device(s) 360. For example, a mobile application on a user device 360 can be configured to communicate battery level information to the transaction server 310. Responsive to the transaction server 310 determining that the battery level is below a threshold value, the transaction server 310 can identify, from among the charging stations 330-334 that are currently available, a charging station 330 that is closest to the customer's current location. Further, the transaction server 310 can communicate an alert, for example as previously described, indicating to the user that the battery level is below the threshold value and that the charging station 330 currently is available. The alert also can present a map indicating where the charging station 330 is located, the customer's present location, and one or more routes for the customer to get to the charging station 330. Again, the one or more coupons, offers, etc. for one or more establishments within a threshold distance of the charging station, or an establishment in which the charging station 330 is located.

The foregoing arrangements and examples assume customer authorization to participate in the various processes. For example, via a mobile application or web-based application, the customer can opt in or opt out of various processes, such as location tracking, monitoring and/or tracking of certain customer activities, etc. Moreover, it is anticipated that customers will take affirmative actions via the mobile application or web-based application to create a user account and participate in the power charging program.

In one or more arrangements, the transaction server 310 can assign the power charging credits to the customer, or deduct power charging credits used by the customer, using a distributed ledger, for example blockchains. In illustration, the transaction server 310 can create one or more blockchain blocks 390 indicating the assignment of the power charging credits to the customer or deduction of power charging credits from the customer. For instance, the transaction server 310 can create a blockchain block 390 including the customer's user ID, the customer's passcode/password, the power charging credits earned by the customer for the in-store transaction, and the power charging credits used by the customer, if any. Optionally, the transaction server 310 also can include in the block 390 additional information, for example data indicating a power charging blockchain 392 to which the block 390 is assigned, data indicating a duration of time for which the power charging credits remain available, data indicating a maximum amount of time one or more user devices 360 may be charged in a particular time period (e.g., per hour, per day, per week, etc.), data indicating a date/time when the power charging credits expire, data indicating user devices 360 for which the power charging credits may be used to charge, data indicating whether the power charging credits are transferable to other users, data indicating a membership level, data indicating a number of user devices that may be simultaneously charged, data indicating make, model, configuration, etc. of one or more of the customer's user devices, data indicating the customer's usage of charging stations 330-334, data indicating an instant messaging address and/or e-mail address of the customer, data indicating the customer's determined activities while using one or more charging stations 330-334, a link to the customer's user profile, and so on. Once created, the blockchain block 390 can be read-only and immutable. This can serve to make transactions recorded in the power charging blockchain 392 immutable and secure from tampering.

The transaction server 310 can communicate, via the cloud computing environment 50 or simply via the Internet, the block 390 to one or more other transaction servers 312 (or other data processing systems) participating in the power charging blockchain 392 to which the block 390 is assigned. For example, if a store is part of a franchise having numerous store locations and a plurality of transaction servers 310, 312, the transaction server 310 can communicate the block 390 to each of the other transaction servers 312. In another example the store, regardless of whether it is part of a franchise, may be part of an agreement allowing for power charging credits that the store issues to be used at other stores and facilities, and for power charging credits that other stores issue to be used at the store. Thus, the store and each of the other stores/facilities can participate in the power charging blockchain 392. In such an arrangement, the transaction server 310 can communicate the block 390 to transaction servers 312 (or other data processing systems) of each of the other stores/facilities participating in that power charging blockchain 392.

Responsive to the other transaction servers 312 (or other data processing systems) receiving the block 390, the other transaction servers 312 (or other data processing systems) can validate the block 390 and add the block 390 to their copy of the power charging blockchain 392. Each of the transaction servers 310, 312 (or other data processing systems) can synchronize their copy of the power charging blockchain 392 from time to time using peer-to-peer blockchain synchronization using known blockchain synchronization techniques.

The use of the power charging blockchain 392 allows the customer to use his/her power charging credits to use other charging stations 340-344 and/or charging lockers 384 at other stores and facilities. For example, the customer can use his/her power charging credits at a kiosk 386 to gain access to the charging locker 384, for example as previously described. Further, the customer can use his/her power charging credits to use other charging stations 330-334 at the store, as well as charging stations 330-334 at other stores and facilities without having to make additional purchases.

In illustration, the customer can use a mobile application executing on the customer's user device 360 to communicatively link to any of the charging stations 330-334, 340-344 and/or charging lockers 380, 384. For example, the user device 360 can link to the charging station 344 or charging locker 384 using a PAN (e.g., Bluetooth® or BTE). In another example, the user device 360 can link to the charging station 344 via a communication cable (e.g., USB cable or Lightening cable) plugged into a charging port of the charging station 344. In an arrangement in which the user device 360 and charging station 344 support powerline communication, the user device 360 can link to the charging station 344 via powerline communication through a power outlet of the charging station 344.

Regardless of the type of communication link, via the communication link the mobile application can interface with the transaction server 312, for example via the charging station 344 or via the charging locker 384 and the charging station controller 322. Using the mobile application, the customer can request charging privileges on the charging station 344, or request access to the charging locker 384 and charging privileges on the charging station 340. For example, the mobile application can communicate the customer's user ID and password or passcode to the transaction server 312. Using the customer's user ID and password or passcode, the transaction server 312 can access one or more blocks 390 of in the power charging blockchain 392 that pertain to the customer.

The transaction server 312 can determine whether the customer has sufficient available power charging credits to use the charging station 344 or charging locker 384. For example, the transaction server 312 can determine a total of available charging credits by summing all of the power charging credits assigned to the customer in blocks 390 of the blockchain 192, and from the sum of the power charging credits deduct a sum of the power charging credits deducted from the customer in blocks 390 of the blockchain 192. The power charging credits that are deducted from the customer can be power charging credits that have been used by the customer or transferred by the customer to another user. The determination of whether the sufficient available power charging credits to use the charging station 344 or charging locker 384 can be based on, for example, whether the total of available charging credits for the customer meets or exceeds a threshold value, for example at least equal to one charging credit, two charging credits, five charging credits, etc.

If the transaction server 312 determines the customer has sufficient available power charging credits to use the charging station 344 or charging locker 384, the transaction server 312 can provide charging privileges on the charging station 344, or access to the charging locker 384 and charging privileges on the charging station 340. The transaction server 312 and charging station controller 322 also can perform any of the other processes previously described as being performed by the transaction server 310 and charging station controller 320, including, but not limited to, generating alerts, ceasing or reducing power delivery, deducting power charging credits based on energy consumption and/or usage of the charging locker 384, adding additional blockchain blocks 390 for the customer to the power charging blockchain 392, communicating the additional blockchain blocks 390 to other transaction servers 310 and data processing systems participating in the power charging blockchain 392, and so on. The additional blockchain blocks 390 can include power charging credit deductions and additions, energy consumption data, user device 360 data, customer activities while using the user device(s) 360, as well as any additional data that may be added to a block, for example other data previously described.

If the transaction server 312 determines the customer does not have sufficient available power charging credits to use the charging station 344 or charging locker 384, via a mobile application or web-based application, the transaction server 312 can present to the customer an offer to purchase power charging credits and/or present a recommendation for the customer to purchase a good and/or service to earn power charging credits, for example as previously described.

In one or more arrangements, via a mobile application or web-based application, the customer can transfer at least a portion of his/her power charging credits to one or more other users. For example, the user can indicate the number of power charging credits to transfer and a user ID of a user to whom the power charging credits are to be transferred. In response, the transaction server 310, 312 with which the application or web-based application is interfacing can create a new blockchain block 390 for the power charging blockchain 392 for the customer containing data indicating at least the user ID of the customer, the user ID of the user to whom the power charging credits are being transferred, and the number of power charging credits being transferred. The new blockchain block 390 also can include other data, for example one or more types of other data previously described. Another blockchain block 390 can be created for the user to whom the power charging credits are being transferred and added for that user to the power charging blockchain 392. For instance, the other block can indicate the user ID of the user to whom the power charging credits are being transferred, the user ID of the customer from whom the power charging credits were received, the number of power charging credits being transferred, etc. The other user may use the transferred power charging credits to use charging stations 330-334, 340-344 and power charging lockers 380, 384 as previously described.

In some circumstances the number of available charging stations 330-334, 340-344 and/or charging lockers 380, 384 maybe scarce. Indeed, the availability may not meet demand. Using a mobile application or web-based application, customers/users may bid for access to the charging stations 330-334, 340-344 and/or charging lockers 380, 384 located within a threshold distance of their respective locations. Responsive to receiving a bid, the transaction server 310 can create another blockchain block 390 indicating the user ID of the user (e.g., customer or other user) placing the bid, the number of power charging credits being bid, and the current location of the user placing the bid. The transaction server 310 also may include any other pertinent data in the new blockchain block 390. The transaction server 310 can add the new blockchain block 390 to the power charging blockchain 392 for the user, add the new blockchain 390 to the power charging blockchain 392 residing at the transaction server 310, and communicate the new blockchain 390 to other transaction servers 312 and data processing systems participating in the power charging blockchain 392, and so on.

Further, the transaction servers 310, 312 can monitor the charging stations 330-334, 340-344 and/or charging lockers 380, 384 for availability, and assign available charging stations 330-334, 340-344 and/or charging lockers 380, 384 to users within a threshold distances of those charging stations 330-334, 340-344 and/or charging lockers 380, 384 who have placed the highest bids. In illustration, responsive to determining a charging station 330 is available, the transaction server 310 can process the power charging blockchain 392 to determine whether there are any users within a threshold distance of the charging station 330 that have placed a bid for use of a charging station or charging station 330-334, 340-344. The transaction server 310 can access an AI system to facilitate this process.

If there are one or more users within a threshold distance of the charging station 330 that have placed a bid for use of a charging station, the transaction server 310 can select the user who placed the highest bid and communicate an alert to that user indicating the charging station 330 is available and the location of the charging station 330. For example, the transaction server can communicate the alert to a mobile application executing on the user's user device 360, an instant messaging address of the user or email address of the user. The transaction server 310 can monitor the charging station 330 for coupling the user's user device 360 to the charging station 330. If such coupling is not detected within a threshold period of time, the transaction servers 310 can select a next highest bidder and communicate an alert to that user, and so on. Responsive to detecting the user coupling to the charging station 330, the transaction server 310 can activate power of the charging station 330 and begin monitoring usage of the charging station 330 by the user, for example as previously described, and perform actions previously described to monitor power station usage, deduct power charging credits based on that usage, etc. If a user other than the user who won the bid couples to the charging station 330, the transaction server 310 can initiate the charging station 330 to generate an alert indicating that the charging station 330 is reserved and not available, for example by rapidly flashing lights (e.g., LEDs), presenting text on a display and/or generating an audible tone. In such case, the transaction server 110 would not activate power delivery to the charging station 330 for the improper user.

In one or more arrangements, users may bid on a certain amount of usage, for example time, energy consumption, number of user devices 360 to be charged, etc. Upon expiration of the time and/or the energy consumption limit being reached, the transaction server 310 can communicate an alert to the user device 360 of the user, for example as previously described, alerting the user that the time and/or the energy consumption limit has been reached. Optionally, the alert can indicate additional time and/or energy consumption that may be provided using available power charging credits of the user and/or offering the user to purchase additional power charging credits. In one or more arrangements, the transaction server 310 can access an AI system that determines the number of power charging credits to charge the user based on various industry models and past data.

In one or more arrangements, as a user moves the transaction server 310 can generate additional blockchain blocks 390 for the user, for example at a periodic interval (e.g., every minute, every five minutes, every ten minutes, etc.), add the additional blockchain blocks 390 to the power charging blockchain 392 residing at the transaction server 310, and communicate the additional blockchain blocks 390 to other transaction servers 312 and other data processing systems participating in the power charging blockchain 392. Accordingly, if the user is moving, the user's bid will be applied to an available charging station or charging locker 380, 384 within a threshold distance of the user's current location.

Figure 4:
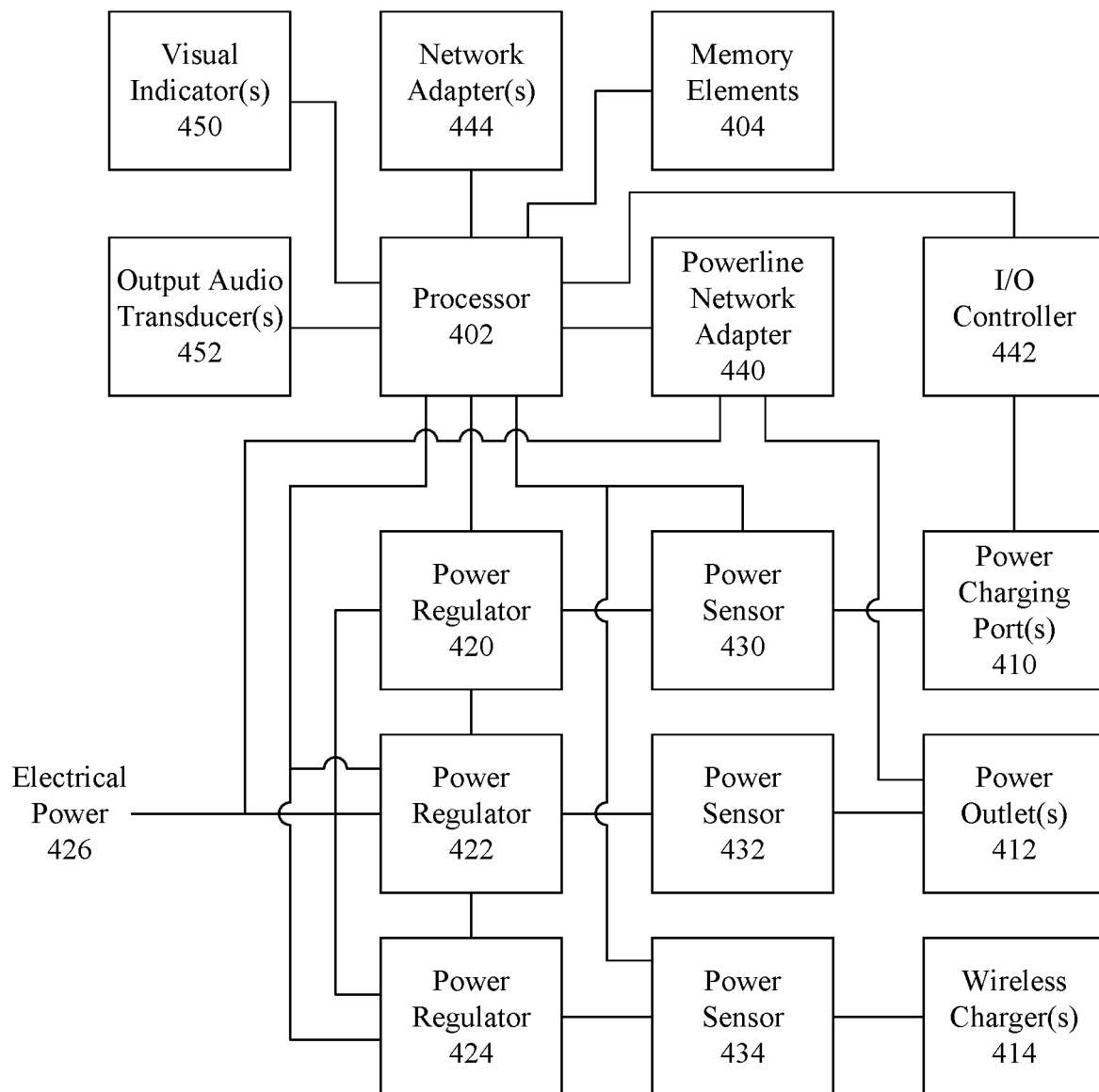
FIG. 4 is a block diagram illustrating example architecture for a charging station.

FIG. 4 is a block diagram illustrating example architecture for the charging station 330. The charging stations 331-334, 340-344 can be configured in a similar manner. The charging station 330 can include a processor 402 (e.g., central processing unit, controller, application specific integrated circuit, etc.) coupled to memory elements 404 through a system bus or other suitable circuitry. As such, the charging station 330 can store program code within the memory elements 404. The processor 402 can execute the program code accessed from the memory elements 404 via the system bus. The memory elements 404 can include, for example, local memory and one or more bulk storage devices. Local memory refers to random access memory (RAM) or other non-persistent memory device(s) generally used during actual execution of the program code. The bulk storage device(s) can be implemented as a hard disk drive (HDD), solid state drive (SSD), or other persistent data storage device. The charging station 330 also can include one or more cache memories (not shown) that provide temporary storage of at least some program code in order to reduce the number of times program code must be retrieved from the local memory and/or bulk storage device during execution.

The charging station 330 also can include one or more power charging ports 410, one or more power outlets 412 and/or one or more wireless chargers 414. Examples of the power charging ports 410 include, but are not limited to, USB ports, Lightening ports, IEEE 1394 (FireWire) ports, and the like. The power outlet 412 can include a power socket configured to receive a conventional AC power plug. The wireless charger 414 can be, for example, an inductive charger comprising an induction coil, for example in accordance with the Qi wireless charging standard.

The charging station 330 also can include a power regulator 420 for the power charging port(s) 410, a power regulator 422 for the power outlet(s) 412 and a power regulator 424 for the wireless charger(s) 414. Each of the power regulators 420, 422, 424 can receive electrical power 426 (e.g., AC power) from an electrical system, for example via an AC power plug or by being hard-wired into the electrical system. The power regulator 420 can convert the electrical power 426 to DC voltage, for example 5 VDC. Further, the power regulator 420 can be activated and deactivated by the processor 402 to turn on and turn off power delivery via the power charging port(s) 410. Further, the power regulator 420 can be controlled by the processor 402 to regulate the level of DC current provided to the power charging port(s) 410. The power regulator 422 can be activated and deactivated by the processor 402 to turn on and turn off power delivery via the power outlet(s) 412. Further, the power regulator 422 can be controlled by the processor 402 to regulate the level of AC current provided to the power outlet(s) 412. In an arrangement in which the voltage provided by the power outlet(s) 412 is different that the voltage of the electrical power 426, the charging station 330 further can include a transformer (not shown) in-line with the power regulator 422 that steps the voltage up or down. The power regulator 424 can be activated and deactivated by the processor 402 to turn on and turn off power delivery via the wireless charger(s) 414. Further, the power regulator 422 can be controlled by the processor 402 to regulate the level of wireless charging power provided by the wireless charger(s) 414.

The charging station 330 also can include a power sensor 430 that measures power consumption by user devices 360 through the power charging port(s) 410, a power sensor 432 that measures power consumption by user devices 360 through the power outlet(s) 412 and a power sensor 434 that measures power consumption by user devices 360 through the wireless charger(s) 414. The power sensors 430, 432, 434 can comprise for example, current sensors. In illustration, the processor can receive current level data from each of the power sensors 430, 432, 434 and, based on that data and the respective voltages, compute the respective energy consumption. In a non-limiting example, one or more of the power sensors 430, 432, 434 can include a voltage sensor. The processor 402 can receive voltage level data from the respective power sensors 430, 432, 434 for use in computing the respective energy consumption. In another example, the respective voltages can be predetermined, and thus voltage sensors not needed.

In an arrangement in which the charging station 330 implements powerline communication with the charging station controller 320 and/or user devices 360, the charging station 330 can include a powerline network adapter 440. The powerline network adapter 440 can be coupled to the electrical power 426 and/or to the power outlet(s) 412. The powerline network adapter 440 can communicate data between the processor 402 and the charging station controller 320 via the electrical wiring that provides the electrical power 426, communicate data between the processor 402 and user devices coupled to the power outlet(s) 412, and communicate data between user devices coupled to the power outlet(s) 412 and the charging station controller 320 via the electrical wiring that provides the electrical power 426.

The charging station 330 can include an input/output (I/O) controller 442 that controls communication between the processor 402 and user devices 360 coupled to the power charging port(s) 410. The processor 402 can exchange such data with the charging station controller 320 and/or the transaction server 310. For example, the processor can exchange such data with the charging station controller 320 via the powerline network adapter 440 and/or one or more network adapters 444. Modems, cable modems, Ethernet cards and wireless transceivers are examples of different types of network adapters 444 that can be used with the charging station 330. The transceivers can include, for instance, a PAN transceiver a WiFi transceiver.

The charging station 330 also can include one or more visual indicators 450, for example LED lights, LED displays, etc., via which the processor 402 presents visual alerts. The charging station 330 also can include one or more output audio transducers 452 via which the processor 402 presents audible alerts. The charging station 330 may include an audio controller (not shown) to which the processor 402 communicates digital audio signals. The audio controller can convert the digital audio signals to analog audio signals, amplify the analog audio signals, and communicate the amplified audio signals to the output audio transducer(s) 452.

Figure 5:
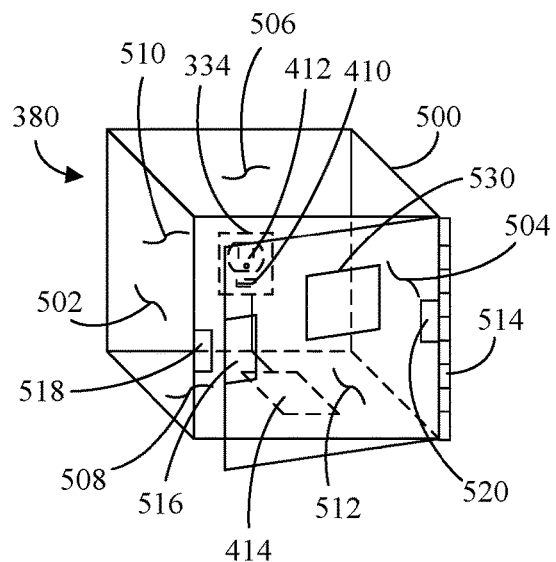
FIG. 5 is a perspective view of an example of a charging locker.

FIG. 5 is a perspective view of an example of a charging locker 380. The charging locker 384 can be configured in a similar manner.

The charging locker can include a secure box 500 comprising a plurality of sides, for example a left side 502, a right side 504, a top side 506, a bottom side 508 and a back side 510. Further, the secure box can include a door 512 attached to the left side 502, right side 504, top side 506 or bottom side 508 via a hinge 514. The door 512 can include a handle 516. The charging locker 380 also can include an electronically actuated lock 518 attached to one of the sides 502, 504, 506, 508 and configured to lock the door 512 in a closed position against front facing edges of the sides 502, 504, 506, 508. The lock 518 can include a sensor that detects whether the door 512 is in the closed position. The charging locker 380 also can include a door actuator 520 or spring that automatically opens the door 512 in response to the lock 518 being released.

Further, the charging locker 380 can include the charging station 334 which, as noted, can be configured in a manner similar to the charging station 330 of FIG. 4. The charging station 334 can include, for example, one or more power charging ports 410, one or more power outlets 412 and/or one or more wireless chargers 414. In an arrangement in which the box 500 is made of metal, an antenna (not shown) of a transceiver of the network adapter(s) 444 (FIG. 4) can be mounted external to the box 500 and connected to the transceiver via wires routed through a hole in the box, for example on the back side 510. External electrical wiring and networking cables connected to the charging station 334 can be routed through a hole in the box, for example on the back side 510.

The electronically actuated lock 518 and door actuator 520 can be communicatively linked to the processor 402 (FIG. 4) of the charging station 334, for example via relays. The processor 402 can be configured to activate relays to actuate the lock 518 between a locked state and an unlocked state. The processor 402 also can be configured to actuate the door actuator 520 via a relay to open the door 512 in response to the lock 518 being actuated into an unlocked state.

The charging locker 380 also can include a user interface 530, which will be described in further detail in FIG. 6. Components of the user interface 530 can be communicatively linked to the processor 402, for example via wiring in the charging locker 380. The processor 402 can receive and process data received from data generating components of the user interface 530, as well as communicate data to information presentation components of the user interface 530.

Figure 6:
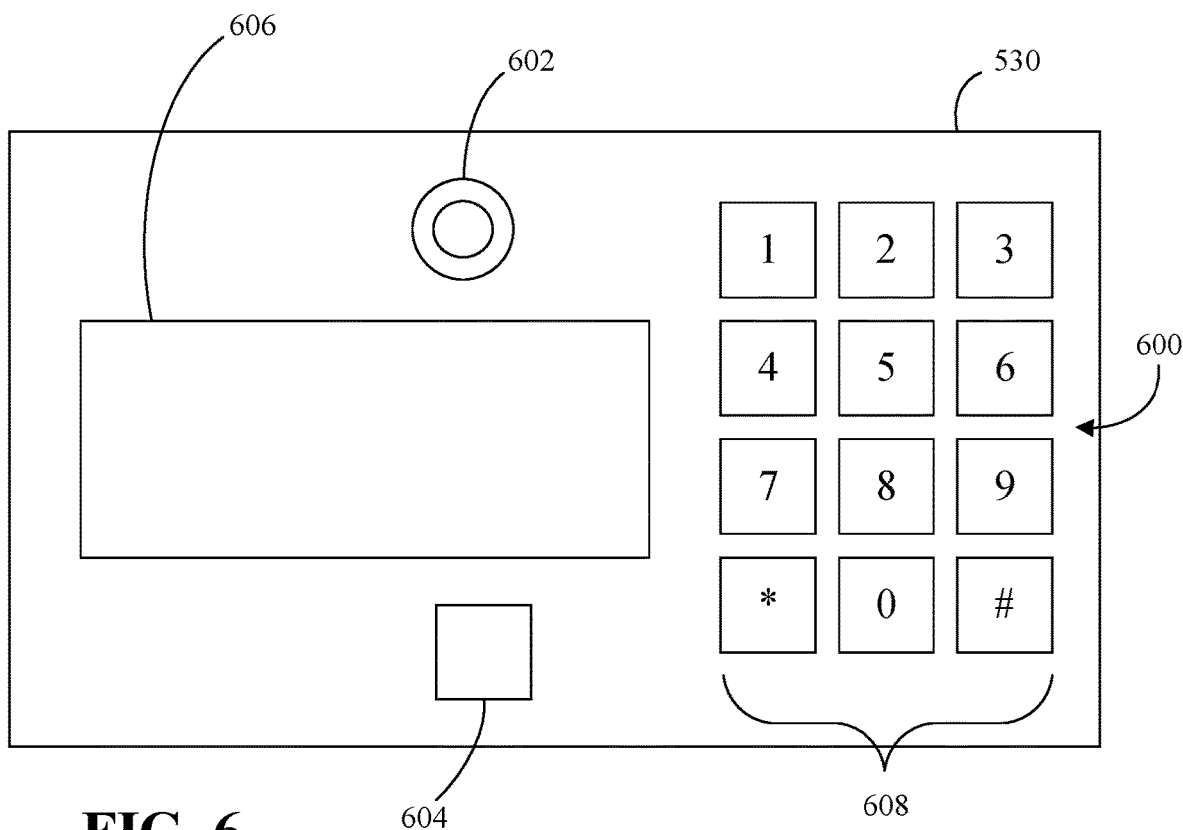
FIG. 6 depicts an example of a user interface of a charging locker.

FIG. 6 depicts an example of the user interface 530 of a charging locker 380. The user interface 530 can include a keypad 600, a camera 602, a fingerprint sensor 604 and a display 606. A user can depress keys 608 of the keypad 600 to enter a passcode to unlock the charging locker 380. In illustration, the keypad 600 can communicate data corresponding to each key 608 depression to the processor 402. Responsive to the proper key combination being entered when the lock 518 (FIG. 5) is in the locked state, the processor 402 can actuate the lock 518 to the unlocked state. Further, the processor 402 can actuate the door actuator 520 to open the door 512. Responsive to a proper key combination being entered, or simply a single key being depressed, when the lock 518 (FIG. 5) is in the unlocked state and the sensor of the lock 518 indicates the door 512 is in the closed position, the processor 402 can actuate the lock 518 to the locked state, thus locking the door closed. In this regard, the sensor of the lock 518 can be communicatively linked to the processor 402.

The camera 602, fingerprint sensor 604 and display 606 each can be communicatively linked to the processor 402 and communicate respective data to the processor 402. Responsive to the camera 602 capturing an image of an authorized user of the charging locker 380, or responsive to the fingerprint sensor capturing a fingerprint of an authorized user of the charging locker 380, when the lock 518 is in the locked state, the processor 402 can actuate the lock 518 to the unlocked state. Further, the processor 402 can actuate the door actuator 520 to open the door 512. Responsive to the camera 602 capturing an image of an authorized user of the charging locker 380, or responsive to the fingerprint sensor capturing a fingerprint of an authorized user of the charging locker 380, when the lock 518 is in the unlocked state and the sensor of the lock 518 indicates the door 512 is in the closed position, the processor 402 can actuate the lock 518 to the locked state, thus locking the door closed.

Via the display 606 the processor 402 can present various information to the user. For example, the processor 402 can present information indicating the charge level of one or more user devices 360 being charged by the charging station 334, an amount of power charging credit deductions thus far accumulated for use of the charging locker 380, an amount of the user's available power charging credits, special offers to the user, and so on.

Figure 7:
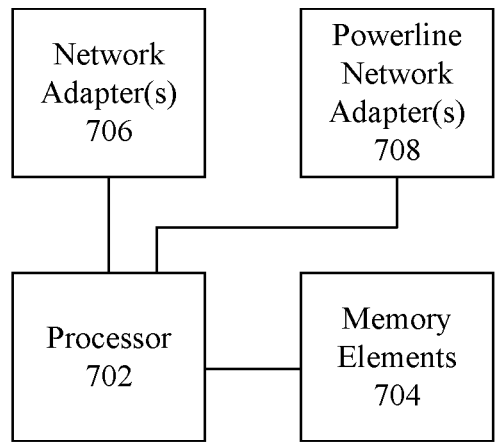
FIG. 7 is a block diagram illustrating example architecture for a charging station controller.

FIG. 7 is a block diagram illustrating example architecture for the charging station controller 320. The charging station controller 322 can be configured in a similar manner. The charging station controller 320 can include a processor 702 (e.g., central processing unit, controller, application specific integrated circuit, etc.) coupled to memory elements 704 through a system bus or other suitable circuitry. As such, the charging station controller 320 can store program code within the memory elements 704. The processor 702 can execute the program code accessed from the memory elements 704 via the system bus. The memory elements 704 can include, for example, local memory and one or more bulk storage devices. The charging station controller 320 also can include one or more cache memories (not shown) that provide temporary storage of at least some program code in order to reduce the number of times program code must be retrieved from the local memory and/or bulk storage device during execution.

The charging station controller 320 also can include one or more network adapters 706. Modems, cable modems, Ethernet cards and wireless transceivers are examples of different types of network adapters 706 that can be used with the charging station controller 320. The transceivers can include, for instance, a PAN transceiver a WiFi transceiver. The charging station controller 320 can communicate with the transaction server 310 via the network adapter(s) 706.

The charging station controller 320 also can include one or more powerline network adapters 708. The charging station controller 320 can communicate with charging stations 330-334 via the powerline network adapters over electrical lines providing power to the charging stations 330-334 and/or communicate with the charging stations 330-334 via the network adapter(s) 706.

As noted, in another arrangement, the charging station controller 320 can be a component of the transaction server 310. In such an arrangement, the processor, memory elements, network adapter(s) and powerline network adapter of the transaction server 310 also may be used as the processor 702, memory elements 704, network adapter(s) 706 and powerline network adapter 708 of the charging station controller 320.

Figure 8:
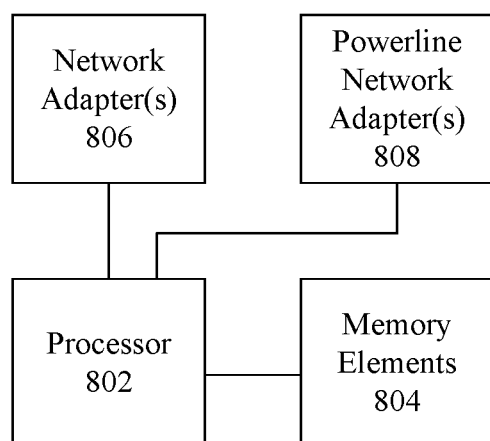
FIG. 8 is a block diagram illustrating example architecture for a transaction server.

FIG. 8 is a block diagram illustrating example architecture for the transaction server 310. The transaction server 310 can include a processor 802 (e.g., central processing unit, controller, application specific integrated circuit, etc.) coupled to memory elements 804 through a system bus or other suitable circuitry. As such, the transaction server 310 can store program code within the memory elements 804. The processor 802 can execute the program code accessed from the memory elements 804 via the system bus. The memory elements 804 can include, for example, local memory and one or more bulk storage devices. The transaction server 310 also can include one or more cache memories (not shown) that provide temporary storage of at least some program code in order to reduce the number of times program code must be retrieved from the local memory and/or bulk storage device during execution.

The transaction server 310 also can include one or more network adapters 806. Modems, cable modems, Ethernet cards and wireless transceivers are examples of different types of network adapters 806 that can be used with the charging station controller 320. The transceivers can include, for instance, a PAN transceiver a WiFi transceiver.

In an arrangement in which the transaction server 310 comprises the charging station controller 320, the transaction server 310 also can include one or more powerline network adapters 808. The transaction server 310 can communicate with charging stations 330-334 via the powerline network adapters over electrical lines providing power to the charging stations 330-334 and/or communicate with the charging stations 330-334 via the network adapter(s) 806.

Figure 9:
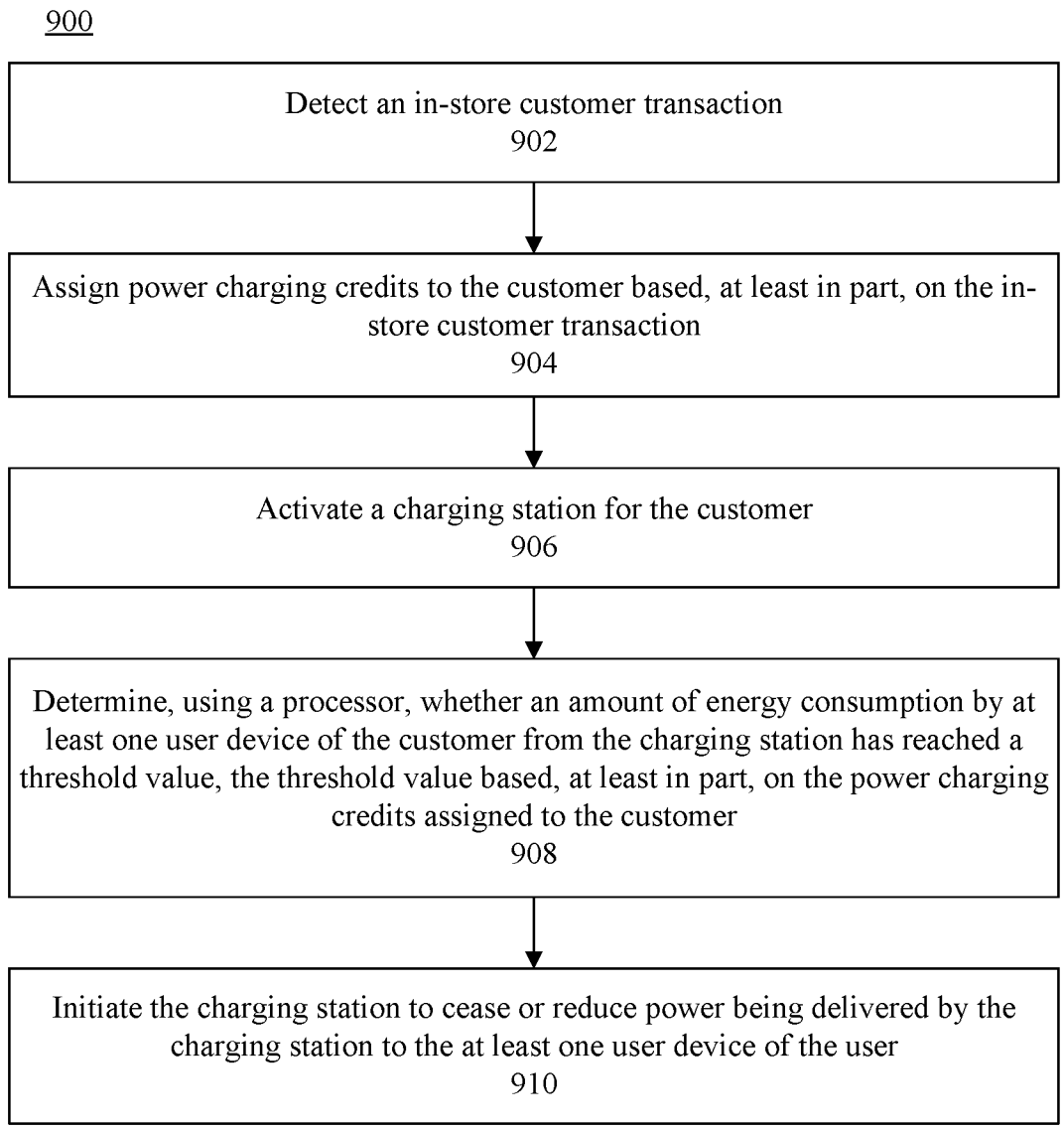
FIG. 9 is a flowchart illustrating an example of a method of providing a power charging service.

FIG. 9 is a flowchart illustrating an example of a method 900 of providing a power charging service. The method can be implemented by the transaction server 310 and/or the transaction server 312. At step 902, the transaction server 310 can detect an in-store customer transaction. At step 904, the transaction server 310 can assign power charging credits to the customer based, at least in part, on the in-store customer transaction. At step 906, the transaction server 310 can activate a charging station for the customer. At step 908, the transaction server 310 can determine, using a processor, whether an amount of energy consumption by at least one user device of the customer from the charging station has reached a threshold value, the threshold value based, at least in part, on the power charging credits assigned to the customer. At step 910, the transaction server 310 can, responsive to determining that the energy consumption by the at least one user device of the customer from the charging station has reached the threshold value, initiate the charging station to cease or reduce power being delivered by the charging station to the at least one user device of the user.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a charging locker comprising a charging station, a power connection to a user device via the charging station;
actuating, by the charging locker, a lock for a door of the charging locker to a locked state;
providing, by the charging station, power that charges the user device;
detecting at least one user event selected from a group consisting of capturing an image of an authorized user of the charging locker, and capturing a fingerprint of the authorized user of the charging locker; and
responsive to detecting user event when the lock for the door of the charging locker is in the locked state, actuating, by the charging locker, the lock for the door of the charging locker to an unlocked state.

2. The method of claim 1, wherein the charging station is operable between an activated state in which the charging station provides power to the user device and a deactivated state in which the charging station does not provide power to the user device.

3. The method of claim 1, further comprising:
presenting, via a display of the charging locker, information indicating a charge level of the user device.

4. The method of claim 1, further comprising:
detecting an in-store customer transaction;
assigning power charging credits to the customer based, at least in part, on the in-store customer transaction;
activating the charging station for the customer;
determining, using a processor, whether an amount of energy consumption by at least one user device of the customer from the charging station has reached a threshold value, the threshold value based, at least in part, on the power charging credits assigned to the customer; and
responsive to determining that the energy consumption by the at least one user device of the customer from the charging station has reached the threshold value, initiating the charging station to cease or reduce power being delivered by the charging station to the at least one user device of the user.

5. The method of claim 1, further comprising:
presenting, via a display of the charging locker, an amount of power charging credits accumulated for user of the charging locker.

6. The method of claim 1, further comprising:
presenting, via a display of the charging locker, an amount of available power charging credits of the user.

7. The method of claim 1, further comprising:
tracking a path of the customer with respect to locations of a plurality of charging stations at a facility;
determining that the charging station, from among those of the plurality charging stations that currently are available, is nearest to a current location of the customer; and
activating the charging station based, at least in part, on the customer remaining within a threshold distance of the charging station at least a threshold period of time.

8. A system, comprising:
a charging locker comprising a charging station configured to receive a power connection to a user device via the charging station; and
a processor programmed to initiate executable operations comprising:
actuating a lock for a door of the charging locker to a locked state;
providing, by the charging station, power that charges the user device;
detecting at least one user event selected from a group consisting of capturing an image of an authorized user of the charging locker, and capturing a fingerprint of the authorized user of the charging locker; and
responsive to detecting the user event when the lock for the door of the charging locker is in the locked state, actuating, by the charging locker, the lock for the door of the charging locker to an unlocked state.

9. The system of claim 8, wherein the charging station is operable between an activated state in which the charging station provides power to the user device and a deactivated state in which the charging station does not provide power to the user device.

10. The system of claim 8, wherein the processor is programmed to initiate executable operations further comprising:
presenting, via a display of the charging locker, information indicating a charge level of the user device.

11. The system of claim 8, wherein the processor is programmed to initiate executable operations further comprising:
detecting an in-store customer transaction;
assigning power charging credits to the customer based, at least in part, on the in-store customer transaction;
activating the charging station for the customer;
determining, using a processor, whether an amount of energy consumption by at least one user device of the customer from the charging station has reached a threshold value, the threshold value based, at least in part, on the power charging credits assigned to the customer; and
responsive to determining that the energy consumption by the at least one user device of the customer from the charging station has reached the threshold value, initiating the charging station to cease or reduce power being delivered by the charging station to the at least one user device of the user.

12. The system of claim 8, wherein the processor is programmed to initiate executable operations further comprising:

presenting, via a display of the charging locker, an amount of power charging credits accumulated for user of the charging locker.

13. The system of claim 8, wherein the processor is programmed to initiate executable operations further comprising:

presenting, via a display of the charging locker, an amount of available power charging credits of the user.

14. The system of claim 8, the system further comprising a transaction server programmed to initiate executable operations further comprising:

tracking a path of the customer with respect to locations of a plurality of charging stations at a facility;

determining that the charging station, from among those of the plurality charging stations that currently are available, is nearest to a current location of the customer; and activating the charging station based, at least in part, on the customer remaining within a threshold distance of the charging station at least a threshold period of time.

15. A computer program product, comprising:

one or more computer readable storage mediums having program code stored thereon, the program code stored on the one or more computer readable storage mediums collectively executable by a data processing system to initiate operations comprising:

receiving, by a charging locker comprising a charging station, a power connection to a user device via the charging station;

actuating, by the charging locker, a lock for a door of the charging locker to a locked state;

providing, by the charging station, power that charges the user device;

detecting at least one user event selected from a group consisting of capturing an image of an authorized user of the charging locker, and capturing a fingerprint of the authorized user of the charging locker; and responsive to detecting the user event when the lock for the door of the charging locker is in the locked state, actuating, by the charging locker, the lock for the door of the charging locker to an unlocked state.

16. The computer program product of claim 15, the operations further comprising:

presenting, via a display of the charging locker, information indicating a charge level of the user device.

17. The computer program product of claim 15, the operations further comprising:

presenting, via a display of the charging locker, an amount of power charging credits accumulated for user of the charging locker.

18. The computer program product of claim 15, the operations further comprising:

presenting, via a display of the charging locker, an amount of available power charging credits of the user.

19. The computer program product of claim 15, the operations further comprising:

detecting an in-store customer transaction;

assigning power charging credits to the customer based, at least in part, on the in-store customer transaction;

activating the charging station for the customer;

determining, using a processor, whether an amount of energy consumption by at least one user device of the customer from the charging station has reached a threshold value, the threshold value based, at least in part, on the power charging credits assigned to the customer; and responsive to determining that the energy consumption by the at least one user device of the customer from the charging station has reached the threshold value, initiating the charging station to cease or reduce power being delivered by the charging station to the at least one user device of the user.

20. The computer program product of claim 15, the operations further comprising:

tracking a path of the customer with respect to locations of a plurality of charging stations at a facility;

determining that the charging station, from among those of the plurality charging stations that currently are available, is nearest to a current location of the customer; and activating the charging station based, at least in part, on the customer remaining within a threshold distance of the charging station at least a threshold period of time.

* * * * *